US009643037B2

(12) United States Patent
Vermeersch et al.

(10) Patent No.: US 9,643,037 B2
(45) Date of Patent: May 9, 2017

(54) OVEN APPLIANCE AND A FLAME ARRESTER FOR AN OVEN APPLIANCE

(71) Applicant: General Electric Company, Schenectady, NY (US)

(72) Inventors: Catherine Alice Vermeersch, Louisville, KY (US); Darren Allen Turner, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 331 days.

(21) Appl. No.: 14/503,500

(22) Filed: Oct. 1, 2014

(65) Prior Publication Data

US 2016/0096050 A1 Apr. 7, 2016

(51) Int. Cl.

| | |
|---|---|
| *A47J 37/00* | (2006.01) |
| *A62C 4/00* | (2006.01) |
| *F24C 15/02* | (2006.01) |
| *A62C 3/00* | (2006.01) |
| *F24C 15/00* | (2006.01) |
| *F24B 13/00* | (2006.01) |
| *F23M 11/02* | (2006.01) |
| *F24C 3/12* | (2006.01) |
| *F24C 15/14* | (2006.01) |

(52) U.S. Cl.
CPC ................ *A62C 3/006* (2013.01); *A62C 4/00* (2013.01); *F23M 11/02* (2013.01); *F24B 13/004* (2013.01); *F24C 3/128* (2013.01); *F24C 15/006* (2013.01); *F24C 15/02* (2013.01); *F24C 15/021* (2013.01); *F24C 15/14* (2013.01)

(58) Field of Classification Search
CPC ..... F24B 13/004; F23M 11/02; F24C 15/006; F24C 15/02; F23D 14/825; A62C 4/00; A62C 3/065
USPC .................. 99/467, 473, 474; 126/193, 198; 431/346, 350
See application file for complete search history.

(56) References Cited

U.S. PATENT DOCUMENTS

| | | | | |
|---|---|---|---|---|
| 3,348,023 A | 10/1967 | Lewis et al. | | |
| 4,505,194 A * | 3/1985 | Bishop | A47J 37/1228 | 454/49 |
| 5,797,355 A * | 8/1998 | Bourke | F23D 14/72 | 122/14.21 |
| 2010/0006086 A1* | 1/2010 | Iwamoto | F24C 15/327 | 126/21 R |

FOREIGN PATENT DOCUMENTS

| | | |
|---|---|---|
| CA | 1146636 | 5/1983 |

* cited by examiner

*Primary Examiner* — Reginald L Alexander
(74) *Attorney, Agent, or Firm* — Dority & Manning, P.A.

(57) ABSTRACT

An oven appliance with features for dissipating pressure increases in the cooking chamber of the oven without forcing open the oven door is provided. Such features include a flame arrester that dissipates pressure increases and quenches flames from the cooking chamber of an oven appliance.

17 Claims, 5 Drawing Sheets

OVEN APPLIANCE AND A FLAME ARRESTER FOR AN OVEN APPLIANCE

FIELD OF THE INVENTION

The present subject matter relates generally to oven appliances, such as French door oven appliances, and flame arresters for the same.

BACKGROUND OF THE INVENTION

Oven appliances generally include a cabinet that defines a cooking chamber for receipt of food articles for cooking and an opening for accessing the cooking chamber. Certain oven appliances include a pair of doors rotatably mounted to the cabinet at the opening to permit selective access to the cooking chamber through the opening. Oven appliances having such doors are generally referred to as French door style oven appliances.

French door style oven appliances generally include a gasket extending between the doors and the cabinet at the opening of the cabinet when the doors are in a closed position. The gasket can assist with insulating the cooking chamber and/or with containing cooking fumes within the cooking chamber. To keep the doors compressed against the gasket, certain French door style oven appliances include a spring roller assembly that holds the doors in the closed position through the engagement of, e.g., a roller and a strike plate.

However, the spring roller assembly can suffer certain shortcomings.

More specifically, a certain amount of force is required to close the doors and engage the spring roller assembly. If food items and/or residue ignite during a cooking or cleaning cycle of the oven appliance, the pressure of the fluid within the cooking chamber increases, which may force the doors open. After the pressure of the fluid has been dissipated through the open doors, the doors alone generally are not able to exert the force required to re-engage the spring roller assembly. Thus, the doors may remain open, allowing heat, gases, and fumes generated in the cooking chamber to escape through the open doors, as well as supplying oxygen to the cooking chamber that could fuel a fire within the cooking chamber. Further, an opening between the cooking chamber and the exterior of the oven appliance could allow flames from burning food items and/or residue to escape from the cooking chamber and pose a hazard to a user of the oven appliance and others.

Accordingly, an oven appliance with features for dissipating pressure increases in the cooking chamber of the oven without forcing open the oven door would be beneficial. In particular, a flame arrester that dissipates pressure increases in the cooking chamber of an oven appliance would be useful. Additionally, a flame arrester with features for quenching flames from the cooking chamber of an oven appliance would be advantageous.

BRIEF DESCRIPTION OF THE INVENTION

The present subject matter provides an oven appliance with features for dissipating pressure increases in the cooking chamber of the oven without forcing open the oven doors. Such features include a flame arrester that dissipates pressure increases and quenches flames from the cooking chamber of an oven appliance. Additional aspects and advantages of the invention will be set forth in part in the following description, or may be apparent from the description, or may be learned through practice of the invention.

In a first exemplary embodiment, an oven appliance is provided. The oven appliance includes a cabinet defining a cooking chamber configured for receipt of food items for cooking, the cabinet further defining an opening at a front portion of the cabinet; a door mounted to the cabinet, the door being selectively adjustable between an open position and a closed position to permit selective access to the cooking chamber through the opening of the cabinet; and a flame arrester. The flame arrester includes a first portion defining a first plane, the first plane defining a first perforated area; a second portion defining a second plane, the second plane defining a second perforated area; and a third portion extending between the first and second portions. The second portion is spaced apart from the first portion to define a space therebetween, and the flame arrester is positioned in a fluid passageway between the cooking chamber and an environment external to the cooking chamber such that a flow of fluid between the cooking chamber and the external environment passes through the first perforated area and the second perforated area of the flame arrester.

In a second exemplary embodiment, a flame arrester for an oven appliance is provided. The flame arrester includes a first portion defining a first plane; a second portion defining a second plane, the second portion spaced apart from the first portion to define a space therebetween; and a third portion extending between the first and second portions. The first plane defines a first perforated area and the second plane defines a second perforated area. The first plane is parallel to the second plane, and the first and second perforated areas are positioned in a flow of fluid such that the fluid can flow through the first and second perforated areas.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Use of the same reference numerals in different figures denotes the same or similar features.

DETAILED DESCRIPTION

Figure 1:
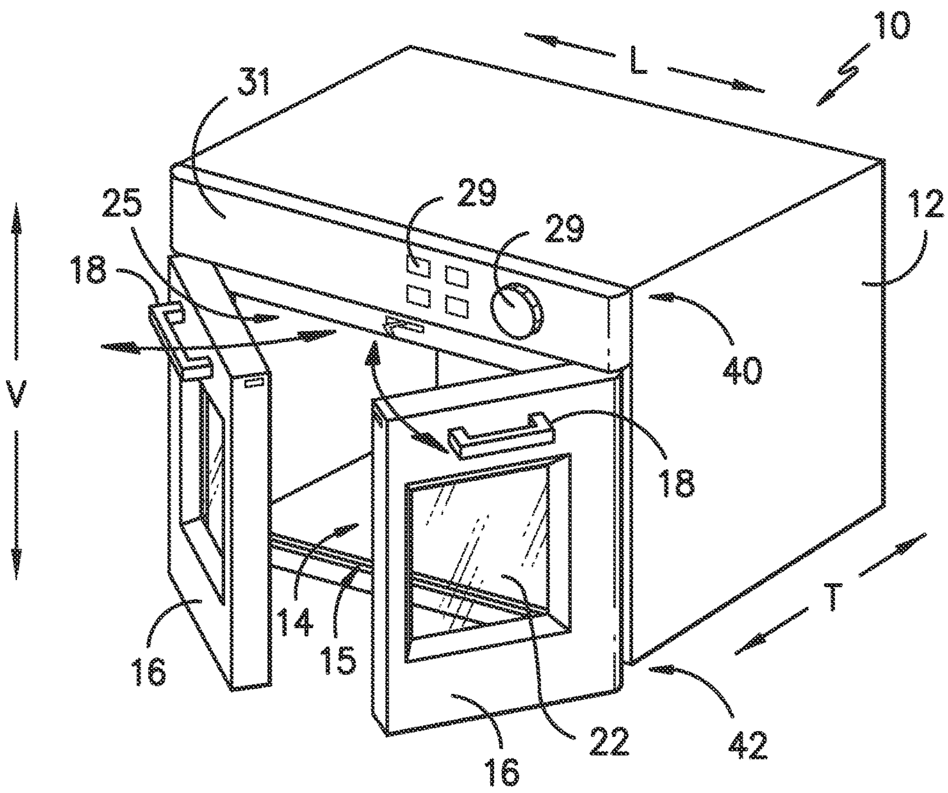
FIG. 1 provides a front, perspective view of an oven appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
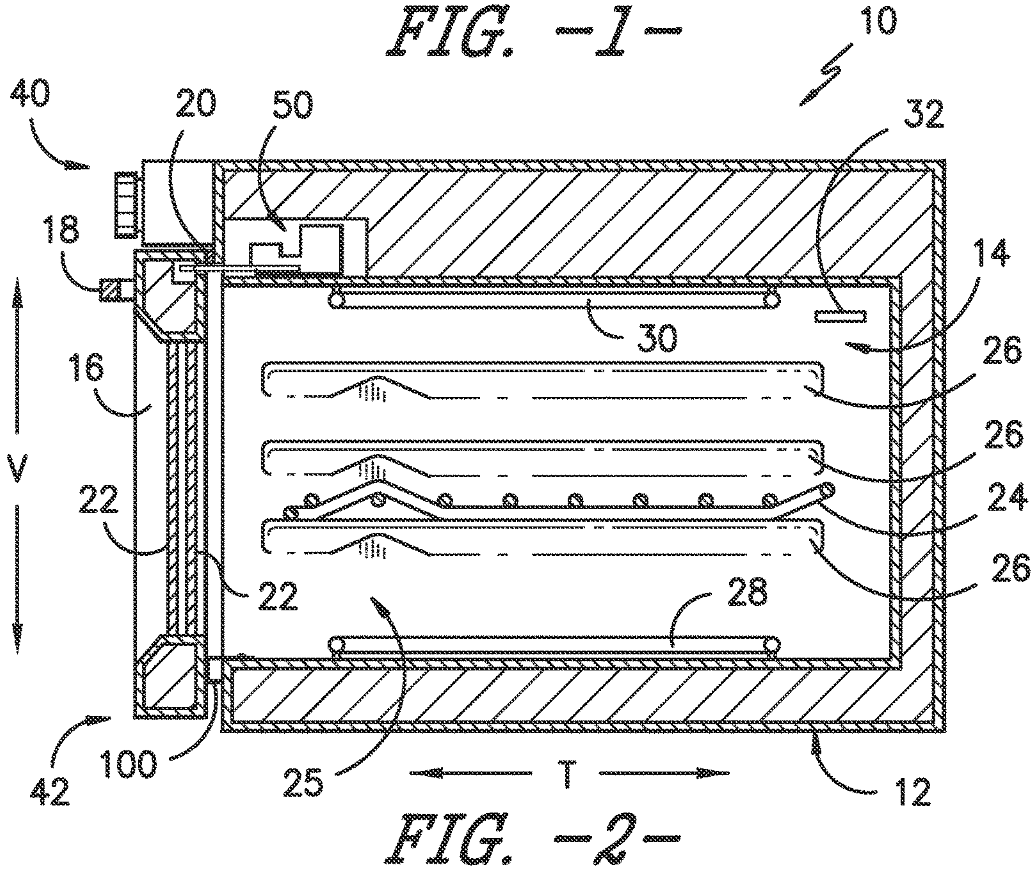
FIG. 2 provides a side, section view of the exemplary oven appliance of FIG. 1.

FIGS. 1 and 2 illustrate an oven appliance 10 according to an exemplary embodiment of the present subject matter. Cabinet 12 defines a vertical direction V, a lateral direction L and a transverse direction T. The vertical, lateral, and transverse directions V, L, and T are mutually perpendicular and form an orthogonal direction system. Cabinet 12 extends between a top portion 40 and a bottom portion 42 along the vertical direction V.

Oven appliance 10 includes an insulated cabinet 12 with an interior surface 25 that defines a cooking chamber 14. Cooking chamber 14 is configured for the receipt of one or more food items to be cooked. Oven appliance 10 also includes a pair of doors 16 rotatably mounted on cabinet 12 proximate an opening 15 to chamber 14 defined by cabinet 12. Thus, oven appliance 10 is sometimes referred to as a French door style oven appliance. Doors 16 are configured for selectively shifting between an open position or configuration shown in FIG. 1 in which a user can access cooking chamber 14 and a closed position or configuration shown in FIG. 2 in which the user is impeded from accessing cooking chamber 14 by doors 16. Handles 18 are attached to doors 16 and assist with shifting doors 16 between the open and closed positions. Glass panes 22 provide for viewing the contents of chamber 14 when doors 16 are in the closed position as well as providing insulation between chamber 14 and the exterior of oven appliance 10. A rack 24 is positioned in chamber 14 for the receipt of food items. Rack 24 is slidably received onto ribs/rails 26 such that rack 24 may be conveniently moved into and out of chamber 14 when doors 16 are open. Multiple rails 26 are provided so that the height of rack 24 may be adjusted.

One or more gaskets 20 between doors 16 and cabinet 12 provide for maintaining heat and cooking fumes within chamber 14 when doors 16 are in the closed position as shown in FIG. 2. Gaskets 20 may or may not be located around the entire perimeter of opening 15. In the embodiment shown in FIG. 2, a flame arrester 100 is included in place of a gasket 20 at the bottom portion 42 of cabinet 12. In alternative embodiments, gaskets 20 may extend around the entire perimeter of opening 15 and flame arrester 100 may be positioned in one or both of the pair of doors 16 or within cooking chamber 14.

Heating elements 28 and 30 are positioned within chamber 14 of cabinet 12. Heating elements 28 and 30 are used to heat chamber 14 for both cooking and cleaning of oven appliance 10. The operation of oven appliance 10 including heating elements 28 and 30 is controlled by one or more processing devices (not shown) such as a microprocessor other device that is in communication with such components. User manipulated controls 29 on control panel 31 allow the user to make selections regarding temperature, time, and other options. The selections can be communicated to the processing device for operation of oven appliance 10. Such processing device is also in communication with a temperature sensor 32 that is used to measure temperature inside chamber 14. Although only one temperature sensor 32 is shown, it should be understood that multiple sensors can be placed within oven appliance 10 for determining the oven temperature.

Oven appliance 10 is provided by way of example only. Thus, the present subject matter may be used in any other suitable oven appliance configuration. For example, the present subject matter may be used in oven range appliances or oven appliances including a single door to provide access to a cooking chamber of the oven appliance. As a further example, the present subject matter may be used in oven range appliances or in oven appliances that define multiple interior cavities for the receipt of food and/or have different pan or rack arrangements than the exemplary embodiment shown in FIG. 2. Heating elements at the top, back, or sides of chamber 14 may also be provided, and a variety of different types of heating elements such as microwave, halogen, gas fuel, electrical resistance, and combinations thereof may be used. Other configurations may also be used as will be understood by one of skill in the art using the teachings disclosed herein.

Figure 3:
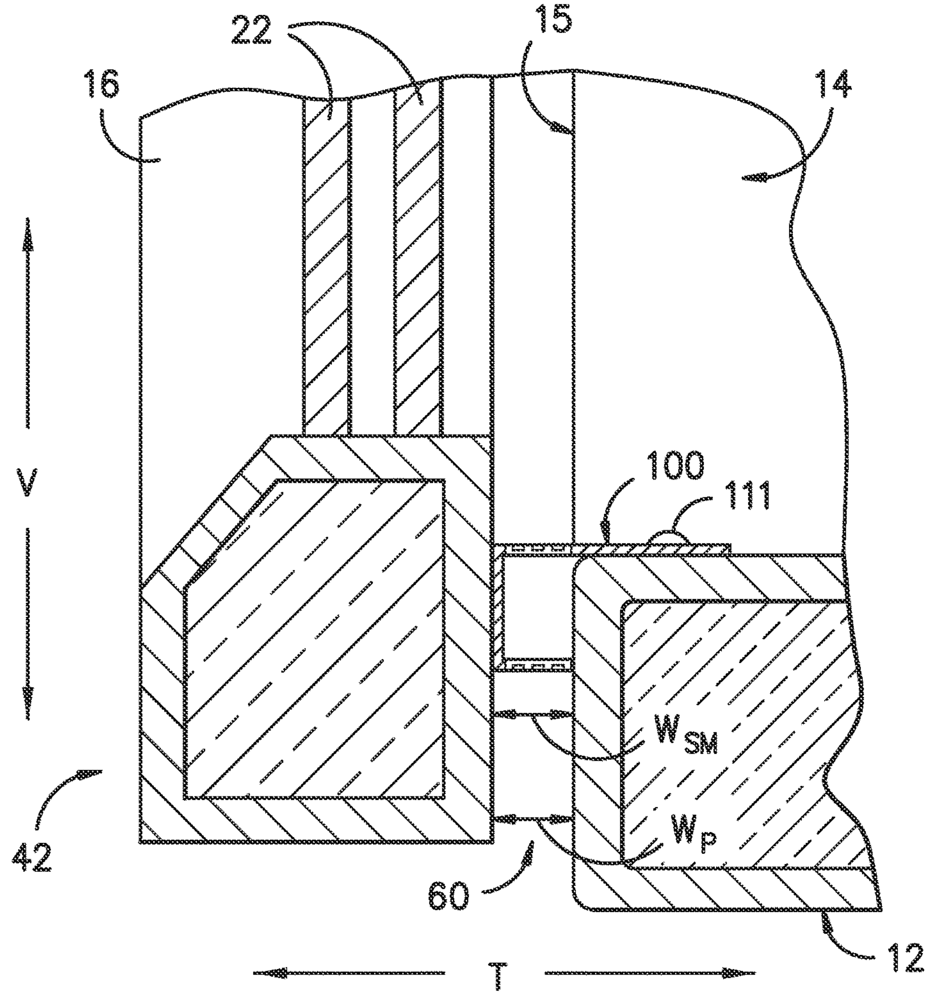
FIG. 3 provides a partial side, section view of the exemplary oven appliance of FIG. 1.

FIG. 3 provides a partial side, section view of oven appliance 10. In particular, FIG. 3 illustrates an enlarged section view of bottom portion 42 of cabinet 12, with flame arrester 100 positioned in a fluid passageway 60. As shown, fluid passageway 60 is formed as an air gap between doors 16 and cabinet 12 at the bottom portion 42 of cabinet 12. Fluid passageway 60 permits a flow of fluid between an interior and an exterior of oven appliance 10. In the exemplary embodiment illustrated in FIG. 3, fluid passageway 60 permits a flow of fluid between cooking chamber 14 and an environment external to chamber 14 such that fluid may flow from chamber 14 to the external environment and from the external environment to chamber 14. More specifically, in the event of ignition of food items and/or residue within cooking chamber 14, the temperature of the fluid within cooking chamber 14 increases and, thus, the pressure of the fluid increases because the volume of the fluid is fixed by the volume of cooking chamber 14. Fluid passageway 60 allows the pressure of the fluid within cooking chamber 14 to dissipate such that doors 16 are not pushed open by the force of the expanding fluid within cooking chamber 14. Further, to prevent any flames from the ignition event from escaping cooking chamber 14, flame arrester 100 may be positioned at or within fluid passageway 60.

Figure 4:
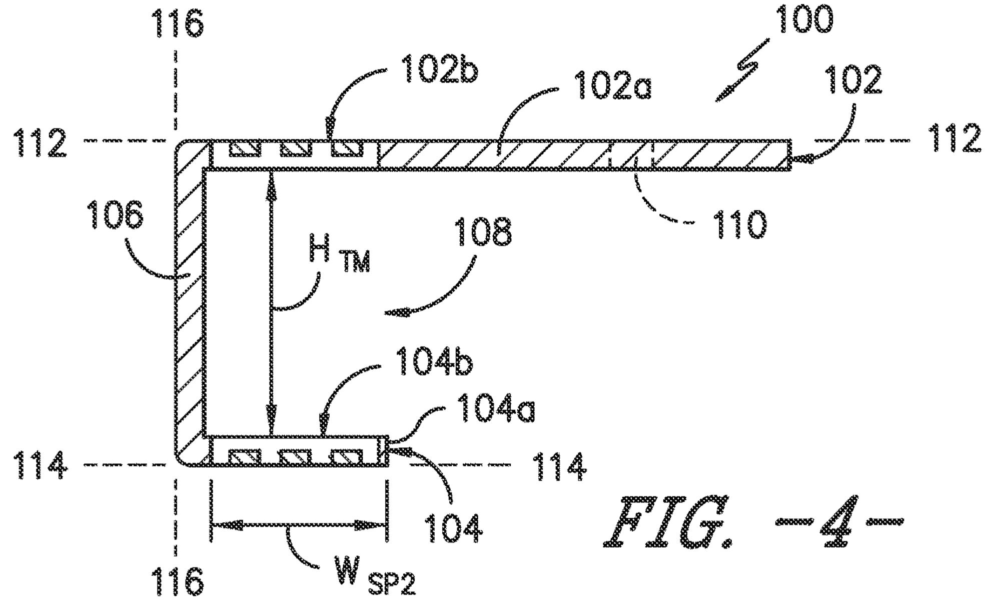
FIG. 4 provides a section view of an exemplary flame arrester of the present subject matter.

Referring now to FIG. 4, flame arrester 100 includes a first member 102, a second member 104, and a third member 106. First member 102 is spaced apart from second member 104 along the vertical direction V, thereby defining a space 108 between first member 102 and second member 104. First member 102 also includes one or more attachment apertures 110 for attaching flame arrester to oven appliance 10, e.g., on interior surface 15 of cabinet 12. Flame arrester 100 may be connected, fixed, or coupled to oven appliance 10 using any appropriate fastener 111 (FIG. 3), e.g., screws or the like, or using any other suitable mechanism. Third member 106 of flame arrester 100 extends between first member 102 and second member 104. Thus, in the exemplary embodiment shown, first, second, and third members 102, 104, 106 form a generally U-shaped channel within fluid passageway 60. Other numbers and configurations of the members of flame arrester 100 may be used as well.

Additionally, first member 102 includes a first portion 102*a* and a second portion 102*b*. First portion 102*a* defines attachment apertures 110. Second portion 102*b* is configured for a flow-through of fluid, and thus, second portion 102*b* may be, e.g., a mesh material or the like comprising a plurality of openings or apertures for the flow-through of fluid. Similarly, second member 104 includes a first portion 104*a* and a second portion 104*b*. Second portion 104*b* is configured for a flow-through of fluid, and thus, second portion 104*b* may be, e.g., a mesh material or the like comprising a plurality of openings or apertures for the flow-through of fluid. Accordingly, when flame arrester 100 is positioned within the flow of fluid from cooking chamber 14 through fluid passageway 60, fluid may flow through second portion 102*b* and second portion 104*b*.

As shown in FIG. 4, first member 102 lies in a plane 112 and second member 104 lies in a plane 114; plane 112 is parallel to plane 114. In addition, third member 106 lies in a plane 116 that is orthogonal to planes 112, 114. Further, second portion 102*b* of first member 102 may lie in plane 112 as illustrated in FIG. 4, or in alternative embodiments, second portion 102*b* may lie in a plane parallel to plane 112. Likewise, second portion 104*b* of second member 104 may lie in plane 114, or in other embodiments, second portion 104*b* may lie in a plane parallel to plane 114.

Figure 5:
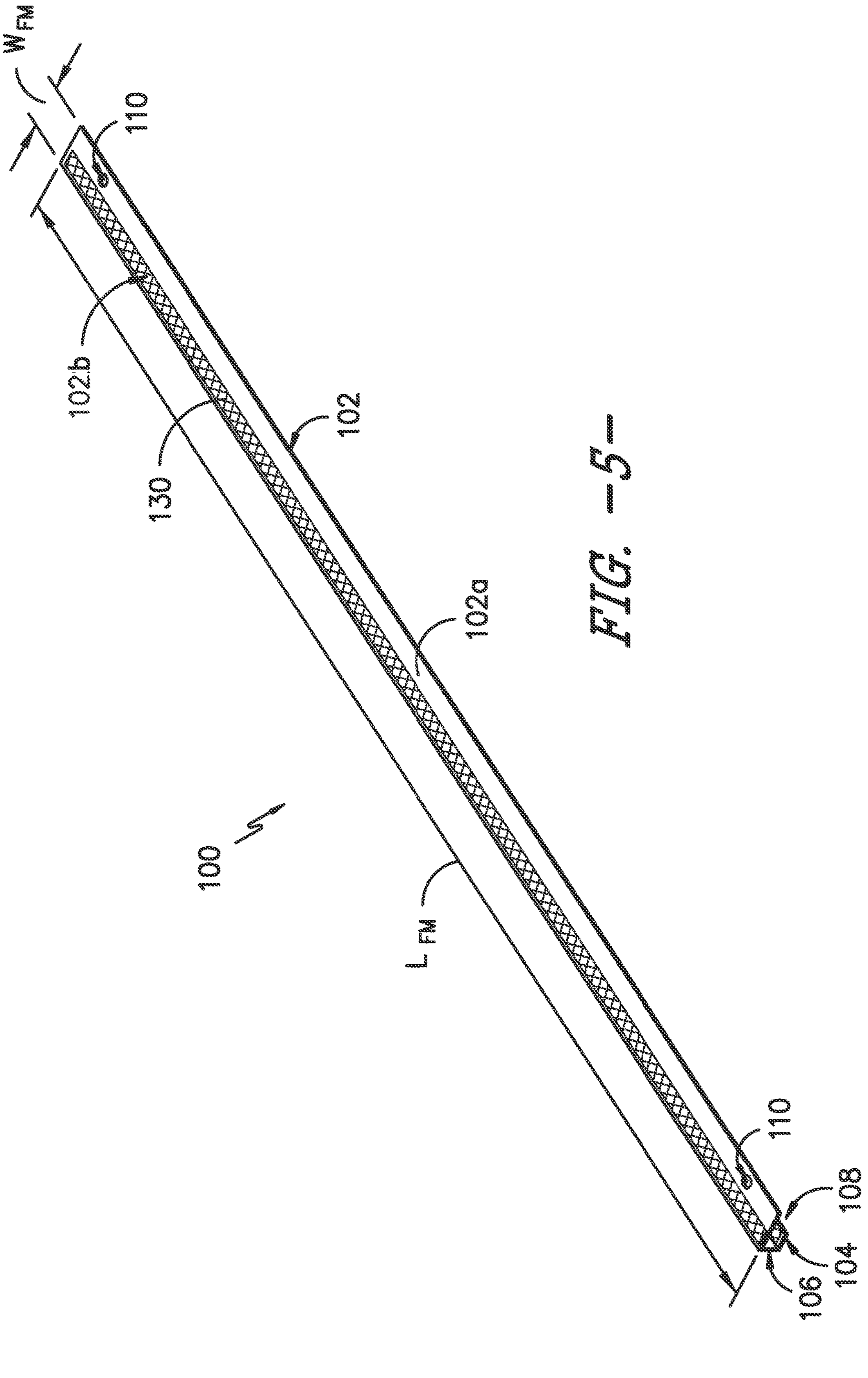
FIG. 5 provides a perspective view of an exemplary embodiment of a flame arrester of the present subject matter.

FIG. 5 provides a perspective view of an exemplary embodiment flame arrester 100. As illustrated, in this exemplary embodiment, second portion 102*b* and second portion 104*b* are constructed from a mesh material 130. Mesh material 130 may comprise a coarse mesh providing larger perforations, a fine mesh providing smaller perforations, or a mesh providing any other appropriately-sized perforations. Alternatively, second portion 102*b* of first member 102 may comprise a coarse mesh material 130 and second portion 104*b* of second member 104 may comprise a fine mesh material 130, or vice versa.

First member 102 has a length $L_{FM}$ and a width $W_{FM}$. As shown, second portion 102*b* extends along a length $L_{SP}$ of first member 102 that is substantially equal to the length $L_{FM}$ of first member 102. Second portion 102*b* has a width $W_{SP1}$ that, in the illustrated embodiment, is a fraction of the width $W_{FM}$ of first member 102 such that first portion 102*a* comprises the remainder of width $W_{FM}$. The length of second member 104 (not shown) may be approximately equal to the length $L_{FM}$ of first member 102, with the length of second portion 104*b* (not shown) being approximately equal to the length $L_{SP}$ of second portion 102*b*. As shown in FIGS. 3 and 4, third member has a height $H_{TM}$, and second member 104 has a width $W_{SM}$ approximately equal to a width $W_P$ of fluid passageway 60. Second portion 104*b* may have a width $W_{SP2}$ that is substantially equal to the width $W_{SM}$ of second member 104. Thus, first portion 104*a* is only a fraction of the total area of second member 104, as the length and width of second portion 104*b* are substantially equal to the length and width of second member 104. In alternative embodiments, first member 102 and second member 104, with their respective first portions 102*a*, 104*a* and second portions 102*b*, 104*b* may have other lengths and widths.

Thus, second portion 102*b*, having a length and width, defines an area in first member 102 through which fluid may flow as described. Similarly, second portion 104*b*, having a length and width, defines an area in second member 104 through which fluid may flow as described. Second portion 102*b* and second portion 104*b* may define a large total open area such that, when positioned in fluid passageway 60, flame arrester 100 provides minimal resistance to the flow of fluid through passageway 60. In other embodiments, second portions 102*b*, 104*b* may have other shapes such that the area for the flow-through of fluid is defined by parameters other than length and width. As an example, second portions 102*b*, 104*b* may be generally circular in shape such that the area for the flow-through of fluid is defined by the radius of second portions 102*b*, 104*b*.

Further, flame arrester 100 may be a single component that extends along opening 15 at bottom portion 42 of cabinet 12. Thus, in the exemplary embodiment shown in FIG. 5, the length $L_{FM}$ may be substantially equal to the length of opening 15 along the lateral direction L. Alternatively, flame arrester 100 may comprise multiple components extending along all or a portion of opening 15 at bottom portion 42. In still other embodiments, flame arrester 100 may be positioned in one or both of the pair of doors 16.

Figure 6:
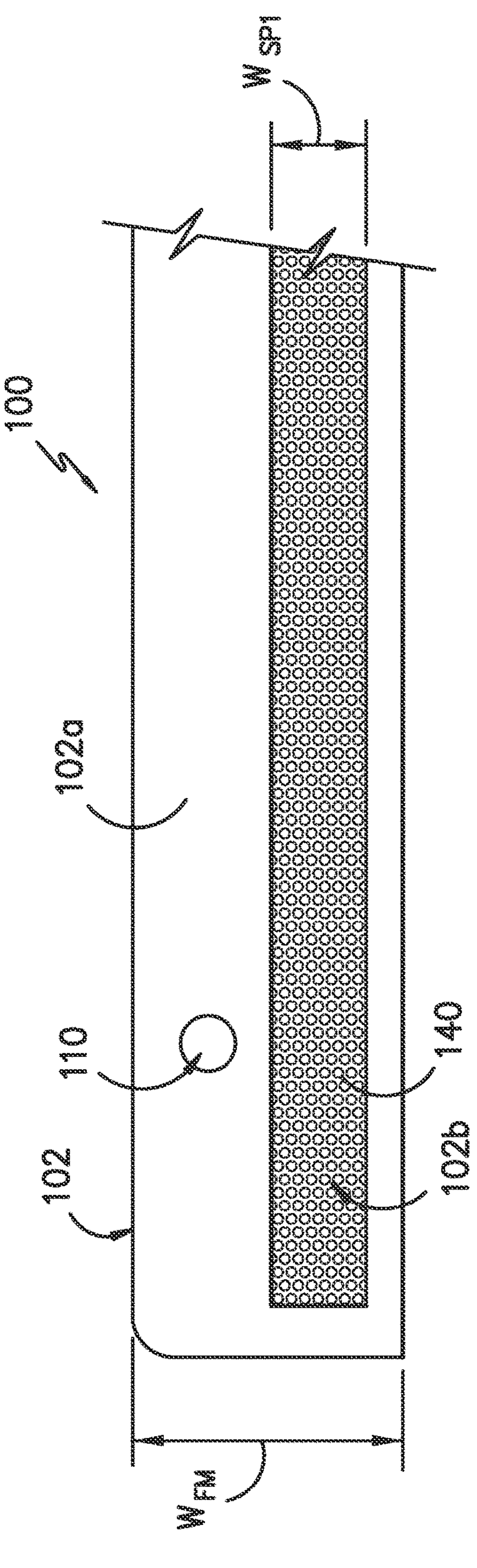
FIG. 6 provides a top, plan view of a portion of an exemplary flame arrester of the present subject matter.
Figure 7:
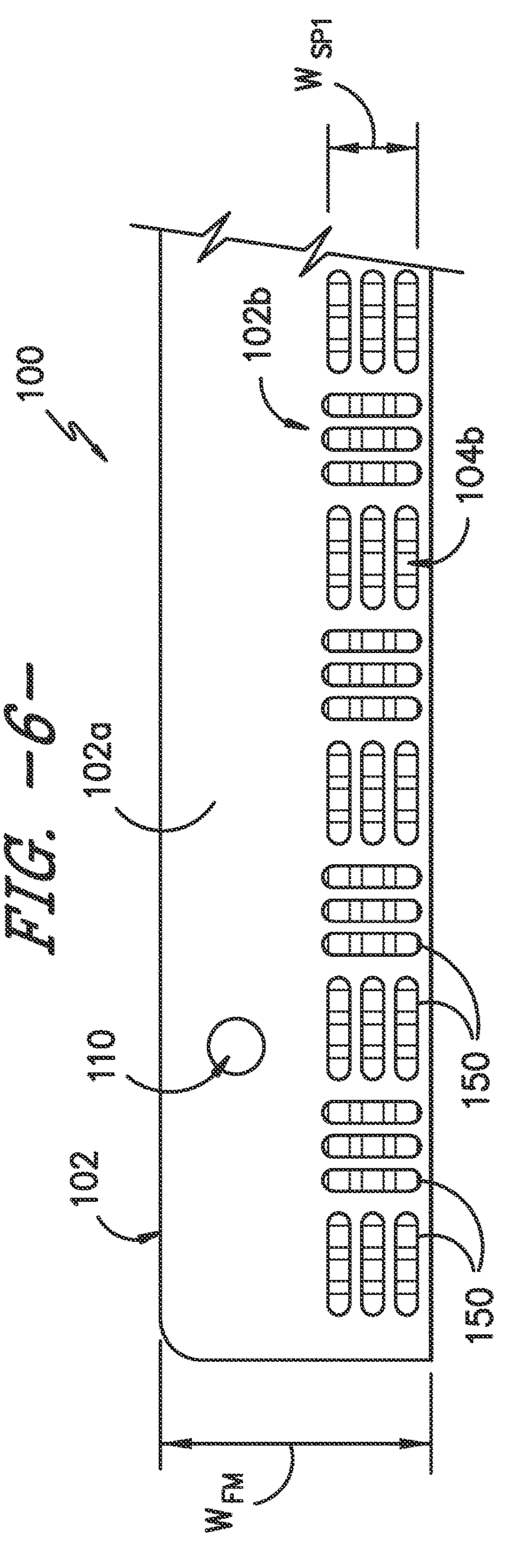
FIG. 7 provides a top, plan view of a portion of another exemplary flame arrester.

Referring now to FIGS. 6 and 7, alternative configurations of second portions 102*b*, 104*b* are illustrated. As shown in FIG. 6, second portion 102*b* may comprise a plurality of small perforations 140 throughout the area defined by length $L_{SP}$ and width $W_{SP1}$. In such embodiments, second portion 104*b* also may comprise a plurality of small perforations 140. Further, as shown in the alternative embodiment of FIG. 7, second portion 102*b* may comprise a plurality of slots 150 arranged in an alternating pattern throughout the area defined by length $L_{SP}$ and width $W_{SP1}$. The pattern may be, e.g., three adjacent slots 150 arranged along the lateral direction L alternated with three adjacent slots arranged along the transverse direction T. Second portion 104*b* also may comprise a plurality of slots 150 arranged in an alternating pattern, but as illustrated, the alternating pattern of second portion 104*b* may be reversed from the pattern of second portion 102*b*. That is, the slots 150 of second portions 102*b*, 104*b* are spaced apart along the vertical direction V, and where adjacent slots 150 of second portion 102*b* extend widthwise across second portion 102*b*, adjacent slots 150 of second portion 104*b* extend lengthwise along second portion 104*b*. Further, where the adjacent slots 150 of second portion 102*b* extend lengthwise along second portion 102*b*, adjacent slots 150 of second portion 104*b* extend widthwise across second portion 104*b*. In other embodiments, second portion 102*b* may comprise, e.g., mesh material 130, a plurality of small perforations 140, or slots 150, and second portion 104*b* may be of a different configuration, such that if second portion 102*b* comprises, e.g., mesh material 130, second portion 104*b* comprises, e.g., slots 150.

Figure 8:
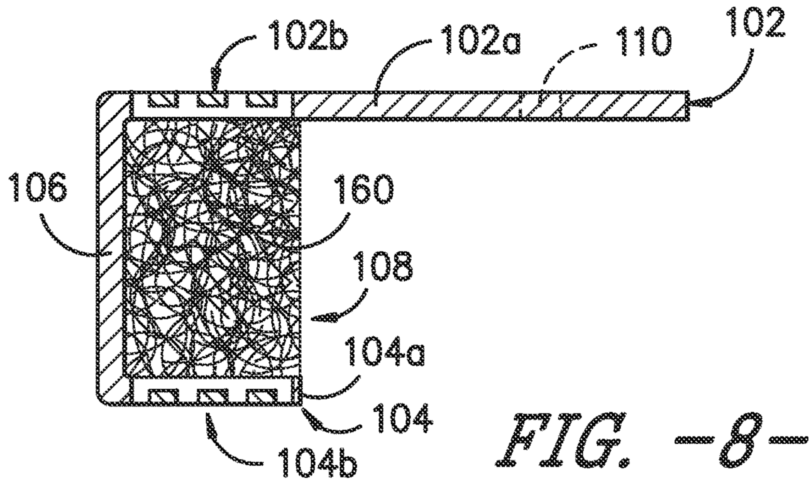
FIG. 8 provides a section view of an exemplary flame arrester of the present subject matter.
Figure 9:
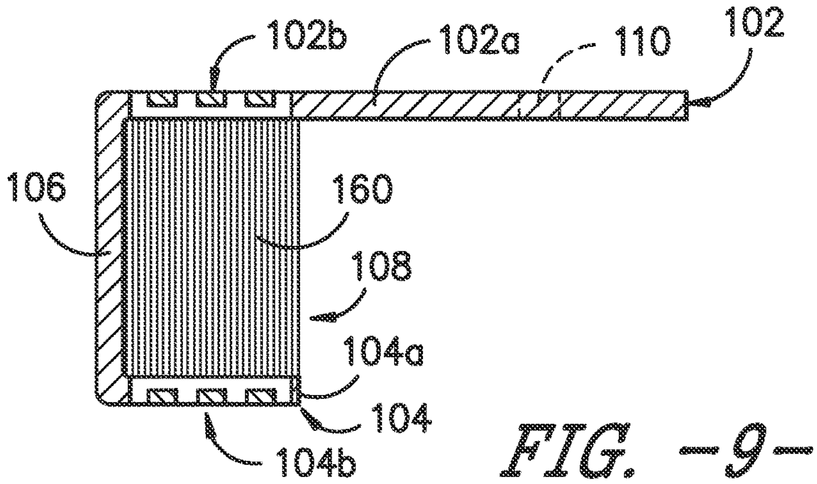
FIG. 9 provides a section view of another exemplary flame arrester of the present subject matter.
Figure 10:
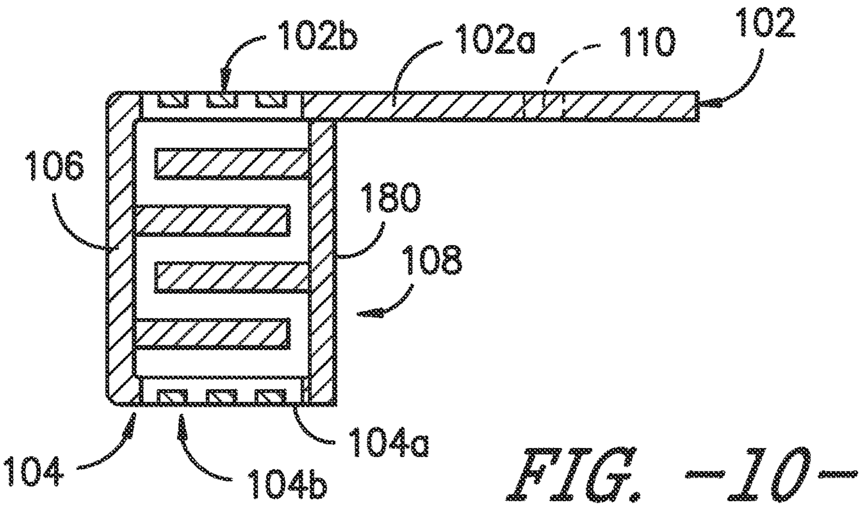
FIG. 10 provides a section view of another exemplary flame arrester of the present subject matter.

As shown in the section views of FIGS. 8-10, flame arrester 100 may also utilize a material in space 108 to quench flames entering fluid passageway 60. For example, as shown in FIG. 8, a wire gauze 160 may be packed in space 108. Wire gauze 160 may fill all of space 108, i.e., for the exemplary flame arrester 100 illustrated in FIGS. 3-5, a volume approximately equal to the volume defined by the length $L_{FM}$ of first member 102, the width $W_{SM}$ of second member 104, and the height $H_{TM}$ of third member 106. In other embodiments, wire gauze 160 may be positioned within only a portion of space 108 such that the volume occupied by wire gauze 160 is defined by other parameters. Alternatively, as illustrated in FIG. 9, parallel plates 170 may be positioned in space 108. Like wire gauze 160, parallel plates 170 may fill all or a portion of space 108. As a further example, as shown in FIG. 10, a labyrinthine path 180 may be constructed between first portion 102 and second portion 104 of flame arrester 100. Similar to wire gauze 160 and parallel plates 170, labyrinthine path 180 may be constructed in all or a portion of space 108. Other materials and configurations of materials within space 108, such as, e.g., a ceramic honeycomb material and catalysts for neutralizing any combustion products, may be used as well.

Accordingly, as described above, flame arrester 100 may include one or more features to break up into a plurality of smaller volumes the volume of fluid exiting cooking chamber 14 through fluid passageway 60. For example, flame arrester 100 includes first member 102 having second portion 102*b* and second member 104 having second portion 104*b*, and flame arrester 100 may be positioned in fluid passageway 60 such that the flow of fluid from cooking chamber 14 to the external environment must flow through second portions 102*b*, 104*b*. The smaller volumes formed as the fluid passes through flame arrester 100 have a greater surface area-to-volume ratio than one larger volume; thus, heat loss from the fluid exiting cooking chamber 14 can be increased. Also, heat from the fluid may be transferred to flame arrester 100. In this way, any flame escaping cooking chamber 14 through fluid passageway 60 can be quenched, and the increased pressure of the fluid within cooking chamber 14 can be dissipated.

Further, it should be understood that flame arrester 100 can be used in any suitable oven appliance. Thus, while described in the context of oven appliance 10, flame arrester 100 is not limited to use in any particular oven appliance configuration or arrangement.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. An oven appliance, comprising:

a cabinet defining a cooking chamber configured for receipt of food items for cooking, the cabinet further defining an opening at a front portion of the cabinet;

a door mounted to the cabinet, the door being selectively adjustable between an open position and a closed position to permit selective access to the cooking chamber through the opening of the cabinet; and a flame arrester positioned between the cabinet and the door, the flame arrester comprising a first member defining a first portion and a second portion, the second portion of the first member configured for the flow-through of fluid;

a second member defining a first portion and a second portion, the second portion of the second member configured for the flow-through of fluid; and a third member extending between the first and second members, wherein the first portion of the first member defines an attachment aperture for attaching the flame arrester to the oven appliance, wherein the second member is spaced apart from the first member to define a space therebetween, and wherein the second portion of the first member and the second portion of the second member are positioned in a fluid passageway such that a flow of fluid through the fluid passageway flows through the second portion of the first member and the second portion of the second member.

2. The oven appliance of claim 1, wherein the second portion of the first member has an area defined by a length and a width of the second portion.

3. The oven appliance of claim 2, wherein the second portion of the second member has an area defined by a length and a width of the second portion, and wherein the area of the second portion of the first member is approximately equal to the area of the second portion of the second member.

4. The oven appliance of claim 1, wherein the first member lies within a first plane and the second member lies within a second plane, and wherein the first plane is parallel to the second plane.

5. The oven appliance of claim 1, wherein the second portion of the first member comprises a plurality of slots arranged in an alternating pattern, and the second portion of the second member comprises a plurality of slots arranged in an alternating pattern.

6. The oven appliance of claim 1, wherein a wire gauze is packed into the space between the first member and the second member.

7. The oven appliance of claim 1, wherein a labyrinthine path for the flow of fluid is formed in the space between the first member and the second member.

8. The oven appliance of claim 1, wherein the second portion of the first member and the second portion of the second member comprise a mesh material.

9. A flame arrester for an oven appliance, comprising:

a first member defining a first portion and a second portion, the second portion configured for the flow-through of fluid;

a second member defining a first portion and a second portion, the second portion configured for the flow-through of fluid, the second member spaced apart from the first member to define a space therebetween; and a third member extending between the first and second members, wherein the wherein the first portion of the first member defines an attachment aperture for attaching the flame arrester to the oven appliance, wherein the first member is positioned in a first plane and the second member is positioned in a second plane, the first plane being parallel to the second plane, and wherein the second portions of the first and second members are positioned in a flow of fluid such that the fluid can flow through the second portions of both the first and second members.

10. The flame arrester of claim 9, wherein the second portion of the first member has an area and the second portion of the second member has an area, and wherein the area of the second portion of the first member is approximately equal to the area of the second portion of the second member.

11. The flame arrester of claim 9, wherein the second portion of the first member comprises a plurality of slots arranged in an alternating pattern, and the second portion of the second member comprises a plurality of slots arranged in an alternating pattern.

12. The flame arrester of claim 11, wherein the alternating pattern of the slots of the second portion of the first member is reversed from the alternating pattern of the slots of the second portion of the second member.

13. The flame arrester of claim 9, wherein a wire gauze is packed into the space between the first member and the second member.

14. The flame arrester of claim 9, wherein a labyrinthine path for the flow of fluid is formed in the space between the first member and the second member.

15. The flame arrester of claim 9, wherein the second portions of the first and second members comprise a mesh material.

16. The flame arrester of claim 9, wherein a plurality of parallel plates are positioned in the space between the first member and the second member.

17. The flame arrester of claim 9, wherein the flame arrester is positioned in a fluid passageway between a door and a cabinet of the oven appliance.

* * * * *